Jan. 5, 1932.  A. J. McGUIRE  1,839,985
SHAFT BEARING
Filed Dec. 28, 1927   3 Sheets-Sheet 1

WITNESSES
F. E. Wadman
J. C. Smith

Inventor
AUGUSTUS J. McGUIRE.
By Irving L. O'Mathran
Attorney

Jan. 5, 1932.  A. J. McGUIRE  1,839,985
SHAFT BEARING
Filed Dec. 28, 1927   3 Sheets-Sheet 2
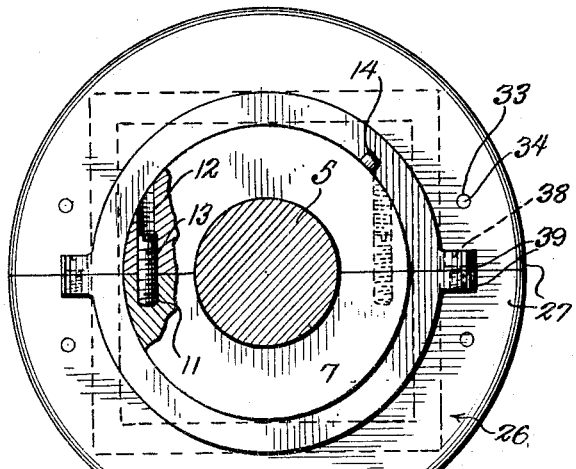
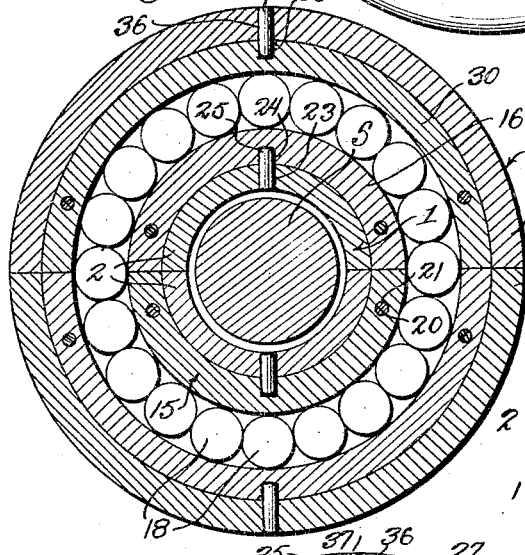
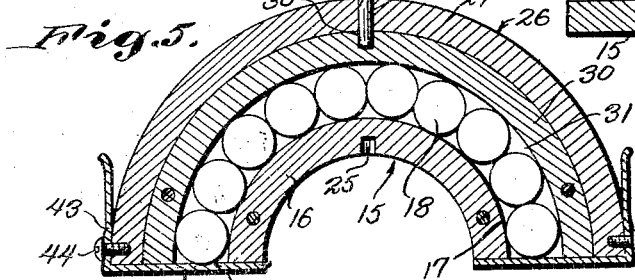
Inventor
AUGUSTUS J. McGUIRE Jan. 5, 1932.  A. J. McGUIRE  1,839,985
SHAFT BEARING
Filed Dec. 28, 1927  3 Sheets-Sheet 3
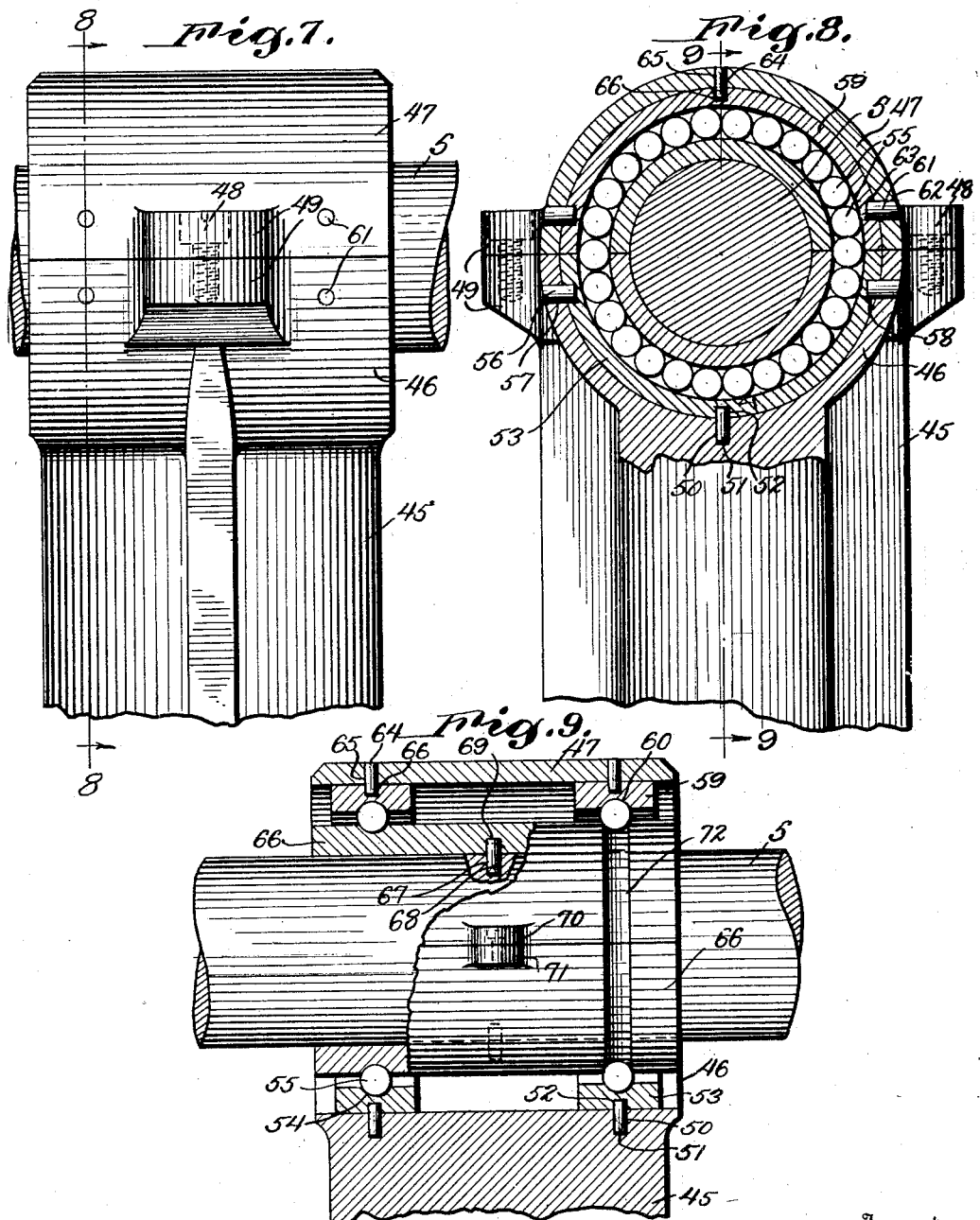

Patented Jan. 5, 1932

1,839,985

UNITED STATES PATENT OFFICE

AUGUSTUS J. McGUIRE, OF NEWARK, NEW JERSEY, ASSIGNOR OF ONE-FOURTH TO JACK C. RICHER, OF NEWARK, NEW JERSEY

SHAFT BEARING

Application filed December 28, 1927. Serial No. 243,070.

This invention relates to improvements in shaft bearings and more particularly to an improvement in bearings of the type embodying anti-friction bearing elements such as balls or rollers.

It is frequently necessary to employ bearings of the type referred to above in places where the bearings cannot be replaced or repaired, in the event, for example, of wearing of the anti-friction bearing elements and their races, or a breakage of any of the parts, without completely dismounting the shaft which is journaled in the bearing, and this of course involves considerable time and labor and frequently necessitates the interruption of the operation of the mechanism of which the shaft constitutes an essential part, for an extended period of time. It is therefore the primary object of the invention to provide a bearing of the type referred to which may be either repaired or completely replaced, without the necessity of dismounting the shaft which is journaled therein.

Another object of the invention is to provide a sectional anti-friction bearing comprising parts so assembled and connected that, while the bearing is of a sectional character, no appreciable additional wear will be imposed on the anti-friction bearing elements and the surfaces of the walls of the races in which the bearing elements are arranged will be substantially as smooth and unbroken as the walls of the races of integral bearing elements.

Another object of the invention is to provide a sectional anti-friction bearing so constructed as to provide for convenient and expeditious disassembling of its parts and a reassembling thereof and without the necessity of dismounting the shaft journaled therein or displacing the shaft.

While the accompanying drawings and the description which is to follow, constitute a disclosure of the preferred embodiment of the invention, it will be understood that various changes may be made within the scope of what is claimed.

In the accompanying drawings:

Figure 3 is an end elevation of the bearing;

Figure 4 is a vertical transverse sectional view taken substantially on the line 4—4 of Figure 1 looking in the direction indicated by the arrows;

Figure 5 is a view similar to Figure 4 illustrating one section of the bearing with its component parts assembled and likewise illustrating a means which is provided for retaining the anti-friction bearing elements in the races of the said bearing section;

Figure 6 is a fragmentary view similar to Figure 2 illustrating a modified form of the bearing;

Figure 7 is a side elevation of a modified form of bearing;

Figure 8 is a vertical sectional view therethrough taken substantially on the line 8—8 of Figure 7 looking in the direction indicated by the arrows;

Figure 9 is a vertical longitudinal sectional view taken substantially on the line 9—9 of Figure 8 looking in the direction indicated by the arrows.

The embodiments of the invention illustrated in Figures 1 to 5 inclusive and in Figure 6 are identical except that in the first mentioned embodiment the races for the bearing elements are of a contour to accommodate bearing balls, whereas, in the embodiment shown in Figure 6 the races are of a contour to accommodate bearing rollers, and by reference to these figures it will be observed that the bearing consists, essentially, of two substantially counterpart sections which are adapted to be assembled about the shaft to be journaled and which shaft is indicated by the reference letter S and may be either a power shaft or a driven shaft and constitute a part of any driving or driven mechanism.

Figure 1:
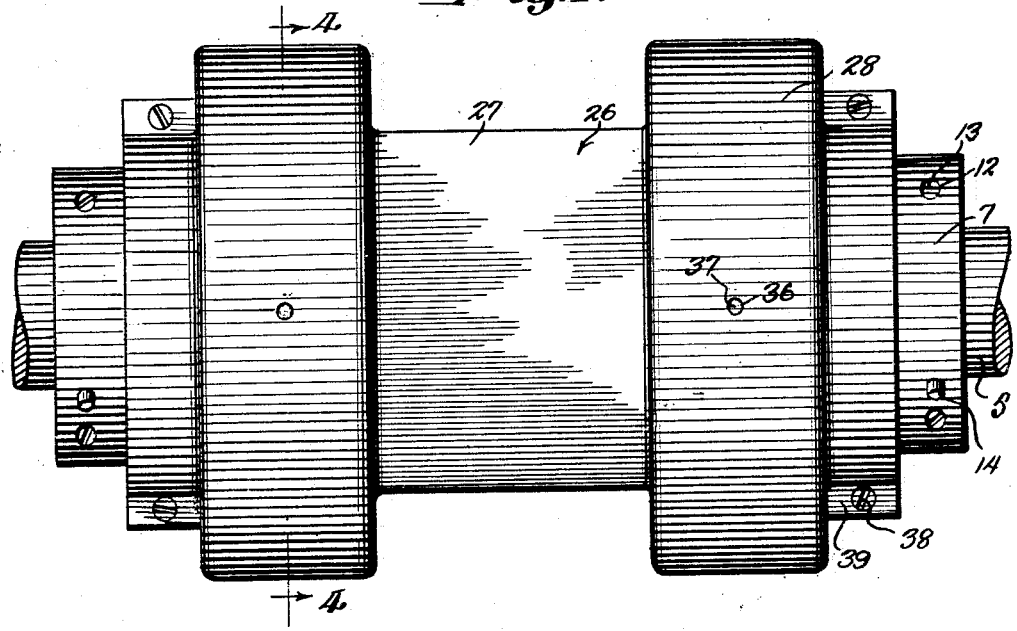
Figure 1 is a plan view of a bearing constructed in accordance with the present invention.
Figure 2:
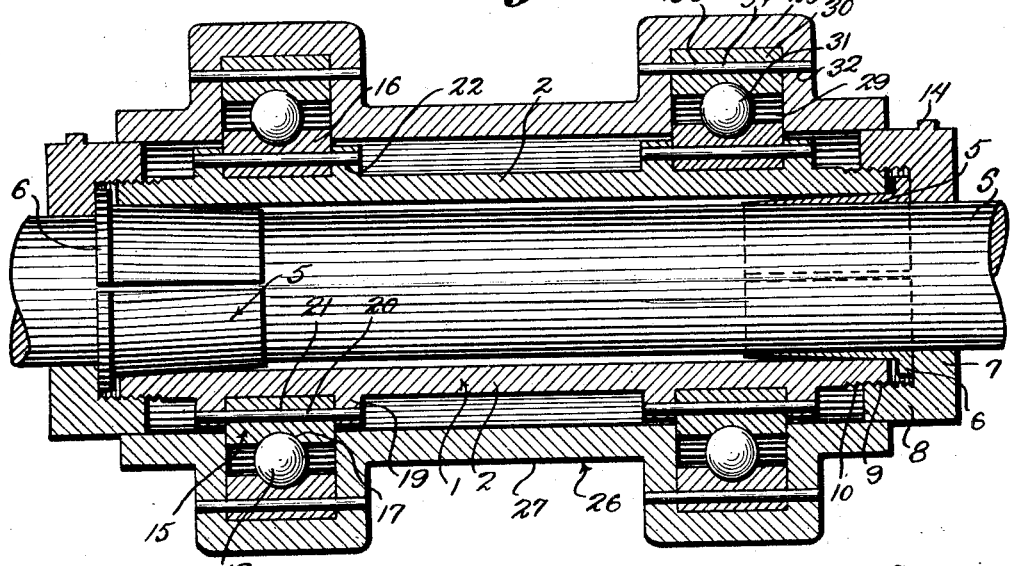
Figure 2 is a horizontal sectional view therethrough.

The bearing includes, in its construction, a sleeve or inner section which is indicated in general by the numeral 1 and which comprises two substantially semi-cylindrical sections 2 assembled in the manner clearly shown in Figures 4 and 6 of the drawings and held in mutually assembled relation through the medium of screws 3 which are secured in matching lugs 4 formed exteriorly upon the halves of the sleeve at the ends thereof as best shown in Figure 6 of the drawings. In order that the sleeve 1 may be held in place upon the shaft S for rotation therewith, bushings 5 are employed, as illustrated in Figures 2 and 6 of the drawings, and each of these bushings comprises a pair of sections interiorly cylindrical and exteriorly conical, the sections of the two bushings being assembled about the shaft S at the ends of the sleeve section 1 of the bearing and fitted into the ends of said section, and due to the exterior conical contour of the bushing sections, the bushings are adapted to have wedging engagement in the said ends of the sleeve section 1. The sections of the bushings 5 are provided at their outer ends and exteriorly with circumferentially extending outwardly projecting flanges 6 providing shoulders at these ends of the sections which shoulders are engaged by collars 7 which are fitted onto the shaft S and which are provided with peripheral flanges 8 which are interiorly threaded as at 9 to adapt the collars to be threaded onto the threaded ends 10 of the sleeve section 1, it being understood at this point that by adjusting the collars 7 upon the ends of the sleeve section 1, the bushings 5 are adapted to be forced into the ends of the sleeve section 1 thus exerting a wedging action between the said section and the shaft S and, as stated, securing the said sleeve section 1 for rotation with the said shaft. Inasmuch as, as previously stated, the invention contemplates a bearing which may be assembled about and removed from a shaft without dismounting the shaft, each of the collars 7 is formed in two sections, as best illustrated in Figure 3 of the drawings, and one section is formed in its chordal side with threaded sockets 11 and the other section is formed in its said side with threaded openings 12 which likewise open through the circumferential side of the section, the sockets 11 and openings 12 being located relatively close to the outer ends of the respective sections, and screws 13 being threaded into the openings 12 and adjusted to likewise enter the sockets 11 and thus connect the sections of the collars together. Each collar is preferably provided at its periphery with an outstanding stud 14 to adapt the collar for the application thereto of a spanner wrench, whereby the collar may be conveniently adjusted, after its sections have been arranged about the shaft and secured together by the screws 13, it being understood that the stud 14 may be formed upon either of the collar sections or one of the studs upon each of said sections, or that either or both of the sections may be provided with one or more sockets if a studded spanner wrench is to be employed. The sleeve section 1 of the bearing constitutes a support for inner race members which are indicated by the numeral 15, and each of these members comprises a pair of semi-annular sections 16 which are adapted to be assembled in matching relation as shown clearly in Figures 2 and 4 of the drawings and which, in the embodiment of the invention shown in Figures 1 to 5 inclusive, are formed in their outer sides with circumferential transversely arcuate grooves 17 to provide, in the assembled relation of the sections 16, a continuous annular race to accommodate bearing balls which are indicated by the numeral 18. In order that the sections 16 of the inner races 15 may be held stationary with respect to the sleeve section 1, the said sleeve section constituting a support for said races, the sections 2 comprising the sleeve are provided exteriorly, near their ends, with spaced circumferential outstanding flanges 19 the inner or opposing sides of which are spaced apart a distance to adapt the said sections of the respective races to be snugly fitted therebetween in the manner best shown in Figure 2 of the drawings and likewise illustrated in Figure 6. Dowel pins 20 are fitted through transverse openings 21 formed in the sections 16 of the said races and through openings 22 formed in the said flanges 19 near the ends of said flanges as clearly shown. In order that the race sections 16 may be centered or properly registered with the respective halves 2 of the sleeve section 1 of the bearing, prior to the introduction of the dowel pins 20 into the openings 21 and 22, registering openings and sockets 23 and 24 respectively are formed in the halves 2 of the section 1 and the race sections 16, and dowel pins 25 are fitted in said openings and sockets. It will be observed by reference to Figure 4 of the drawings that the sockets 24 are formed intermediate the ends of the sections of the race 15 and that the openings 23 are correspondingly located in the halves 2 of the sleeve section 1, and consequently when the said openings 23 are brought into registration with the sockets 24 and the dowel pins 25 are fitted into the said openings and sockets, the ends of the race sections 16 will be flush or in registration with the edges of the sleeve halves with which they are assembled, and at this time the openings 21 and 22 in the said race sections and the flanges 19, will be in registration to permit of the insertion of the dowel pins 20. Therefore, when the halves of the sleeve section 1 are assembled about the shaft and the section is secured for rotation with the shaft through the medium of the bushings 5 and collars 7, and the race sections are assembled about the sleeve section 1 and secured in place, the grooves 17 in the outer sides of the race sections will be continuous and unbroken and their walls will present a smooth surface to the bearing balls 18.

The bearing further comprises a housing which is indicated in general by the numeral 26, and this housing likewise comprises a pair of counterpart sections or halves indicated by the numeral 27. The housing sections 27 are provided near their ends, each with a circumferential or semi-annular hollow enlargement 28 providing, in the inner side of the housing sections at the respective ends, a semi-annular channel 29, and disposed within these channels of each housing section are the sections 30 of the outer races of the bearing, these sections, as in the case of the sections of the inner race, being of semi-annular form and being provided in their inner surfaces each with a transversely arcuate groove 31, the grooves in the sections of each race matching, when the sections are assembled within the respective channels 29 of the housing 26, so as to provide a continuous bearing groove for the outer sides of the bearing balls 18. The opposite walls of each channel 29 in each of the housing sections are formed with oppositely located openings 32, and these openings are located near the ends of the said enlargements and the sections of the outer races are likewise formed with openings 33 located near their ends which openings register with the openings 32 so as to adapt dowel pins 34 to be fitted through the openings thus securing the race sections 30 against displacement in the respective channels 29. In order that the race sections may be accurately centered or matched with the channels 29 in which they are arranged, prior to insertion of the dowel pins 34, each section 30 is formed in its outer side intermediate its ends with a socket 35, and the respective enlargement 28 is formed in its circumferential wall intermediate its ends with an opening 36 which registers with the outer end of the socket, dowel pins 37 being fitted into the said openings 36 and sockets 35 as clearly shown in Figures 4, 5 and 6 of the drawings, so as to properly position the race sections, as stated. It will now be observed by reference to Figures 2 and 6 of the drawings that the outer portions of the sections 16 of the inner races 15 project into the channels 29 at the open sides of the channels, when the sections 27 of the housing 26 are assembled about the sleeve section 1, and that likewise the flanges 8 of the collars 7 are exteriorly of a diameter to fit relatively snugly and yet rotatably within the opposite ends of the housing 26, so as to prevent the entrance of dust and other foreign matter into the bearing. The housing sections are secured together by means of cap screws 38 which are secured in registering lugs 39 formed at the opposite ends of the housing sections at their opposite sides, and, as will be observed by reference to Figures 1 and 3 of the drawings, the portion of the housing intermediate the hollow enlargement 28 may be of rectangular or other contour depending upon the manner in which the bearing is to be mounted or the character of the means by which it is to be supported.

It will be observed that, as previously stated, the embodiment shown in Figure 6 is identical with the embodiment illustrated in Figures 1 to 5 inclusive, except that as shown in the said Figure 6 the sections of the inner and outer races are formed in their outer and inner sides respectively with grooves which are of a contour to accommodate roller bearings indicated by the numeral 40 in the said figure.

In order that the sections 27 of the housing 26, the race sections 30 which are assembled therewith, the bearing elements, and the companion inner race sections 16, may all be held assembled, with regard to that half of the bearing, as a whole, which is to be uppermost, at the time of assembling the bearing, and particularly in order to retain the bearing balls or rollers in place, retaining members 41 such as shown in Figure 5 of the drawings may be employed, and preferably these members are formed of sheet metal and each comprises a body portion 42 which is disposed against the lower edges and ends of the said housing sections 27 and the inner and outer race sections, respectively, and a portion 43 which extends upwardly at an angle therefrom at the outer end thereof and through which a screw 44 may be fitted and threaded into a threaded socket provided in the outer side of the said housing section 26. At this point it will be understood that the members 41 may remain in place until the upper half of the bearing as a whole has been disposed in position above and in matching relation with respect to the lower half of the bearing, whereupon the screws 44 may be removed and the members 41 then bodily separated from the assembled parts, after which the said sections 27 of the housing may be secured together by the screws 38 as previously described.

In the embodiment of the invention shown in Figures 7, 8 and 9 of the drawings, the shaft S is journaled in a bearing including a standard or pedestal indicated by the numeral 45 with which the lower section of the housing of the bearing, indicated by the numeral 46, is integrally formed, this section corresponding substantially to one of the sections of the housing of the previously described embodiment, and the upper section of the housing being indicated by the numeral 47 and being disposed above and in assembled relation with respect to the lower section 46 and held in place by cap screws 48 secured in bosses 49 provided at the opposite sides of the said sections. By reference to Figures 8 and 9 it will be observed that in this embodiment of the invention the supporting member 45 for the lower housing section 46 is provided with sockets 50 in which are disposed the lower ends of dowel pins 51 the upper ends of which pins project into sockets 52 formed in the lower sides of outer race sections 53, each of these sections being formed in its inner side with a groove or channel 54 to accommodate the bearing balls 55 or other bearing elements. Dowel pins 56 are fitted through openings 57 formed in the end portions of the lower section 46 of the housing near the upper edges of said section and project into sockets 58 formed in the outer sides of the said lower race sections 53, so that these race sections are held stationary with respect to the said lower housing section 46. The upper housing section 47 has disposed against its inner side, near its ends, the upper sections 59 of the outer races, and these sections are formed with grooves 60 in their inner sides corresponding to the grooves or channels 54 in the sections 53, the ends of corresponding upper and lower sections of the races registering as shown in Figure 8. The upper race sections are held in place by means of dowel pins 61 fitted through openings 62 formed in the housing section 47 near the lower corners thereof and projecting into sockets 63 formed in the outer sides of the bearing sections 59 near the ends thereof, and the said sections 59 are centered with respect to the upper housing section 47, through the medium of dowel pins 64 fitted through openings 65 in the upper portion of the upper section 47 near the ends thereof and projecting at their lower ends into sockets 66 formed in the upper sides of the upper race sections 59.

In this embodiment of the invention the sleeve section 1 and inner races 15 of the previously described embodiment are replaced by a sleeve 66 which is formed in two longitudinal halves and disposed to surround the shaft S, the shaft being provided in diametrically opposite sides with sockets 67 into which are fitted the inner ends of dowel pins 68, and the said sleeve sections being formed in their inner sides with sockets 69 into which the outer ends of the dowel pins project, the sections comprising the sleeve 66 being in this manner held against displacement with respect to the shaft S and for rotation therewith. The sections or halves of the sleeve 66 are further secured about the shaft S through the medium of cap screws 70 which are secured in registering lugs 71 formed upon the outer sides of the sleeve sections at their meeting edges, it being understood by reference to Figure 9 that the outer side of the sleeve 66 is spaced with respect to the inner sides of the housing sections 46 and 47 a distance sufficient to accommodate the said lugs 71. The said sections of the sleeve 66 are formed near their ends and in their outer sides with circumferential grooves 72 and these grooves match and oppose the grooves 54 in the race sections 53 and the grooves 60 in the race sections 59 and are likewise occupied by the bearing balls 55.

In the drawings the invention has been illustrated as adapted for the use of both ball and roller bearing elements, but it will be understood that other types of bearing elements may be employed without departing from the spirit of the invention.

In all of the embodiments of the invention, the meeting ends of the sections of the bearing races are eased off in proportion to the size of the bearing elements so that the bearing elements will travel smoothly past these joints.

Having thus described the invention, what I claim is:

In a device of the class described, a shaft, an elongated longitudinally divided sleeve fitted about said shaft and having externally threaded end portions, means connecting the divided sections together, sectional tapered bushings positioned upon said shaft and engaging the outer ends of said sleeve, sectional collars having peripheral internally threaded flanges engaging the threaded end portions of said sleeve, whereby said collars will adjustably force said bushings into said sleeve, thereby fixing said sleeve upon said shaft, means securing the sections of the collar together, and means for rotatably supporting said sleeve, as and for the purpose specified.

In testimony whereof I affix my signature.

AUGUSTUS J. McGUIRE.